UNITED STATES PATENT OFFICE.

HERBERT HENRY MEYERS, OF PITTSBURGH, PENNSYLVANIA, ASSIGNOR TO ARMOUR FERTILIZER WORKS, OF CHICAGO, ILLINOIS, A CORPORATION OF NEW JERSEY.

CONTACT PROCESS FOR MAKING SULFURIC ACID.

1,314,280.  Specification of Letters Patent.  Patented Aug. 26, 1919.

No Drawing.  Application filed June 26, 1918. Serial No. 242,004.

*To all whom it may concern:*

Be it known that I, HERBERT H. MEYERS, a citizen of the United States, residing at Pittsburgh, in the county of Allegheny, State of Pennsylvania, have invented certain new and useful Improvements in Contact Processes for Making Sulfuric Acid; and I do hereby declare the following to be a full, clear, and exact description of the invention, such as will enable others skilled in the art to which it appertains to make and use the same.

This invention relates generally to the contact process for producing sulfur trioxid, or sulfuric acid. In another aspect, the invention relates to the production of a water-soluble double sulfate of potassium and aluminum from the mineral alunite. In its complete aspect, the invention involves the making of sulfur trioxid, or sulfuric acid, by the contact method and the simultaneous production of a water-soluble double sulfate of potassium and aluminum from alunite as a result of the use of raw alunite as the catalytic agent in the contact method.

In the contact method for producing sulfur trioxid ($SO_3$), or sulfuric acid, numerous catalysts or contact substances have been proposed, but, for one reason or another, none, as far as is generally known to me, has proved commercially practicable, except platinum and iron oxid. The former, despite its cost, is the most successful and widely used material, as it is possible to produce practically quantitative yields with it and, with proper precautions, its life as a catalyst is indefinitely long. Iron oxid, as a catalyst, is usually used in the form of iron pyrite cinder and, as such, is a by-product of the complete process, being produced when iron pyrites are burned to generate the necessary sulfur dioxid ($SO_2$) gas. Since the yields obtainable with iron oxid are comparatively low, it is practically always used in conjunction with platinum or in conjunction with a chamber system for producing sulfuric acid.

I have discovered that the mineral alunite, which is essentially hydrated basic double sulfate of potassium and aluminum, may be very advantageously employed as the catalyst or contact substance in converting gaseous mixtures containing sulfur dioxid and oxygen into sulfur trioxid. In fact, I have found that alunite is a more efficient and effective catalytic agent than iron oxid.

The present invention, accordingly, involves, in the process of making sulfur trioxid by the contact method, bringing a gaseous mixture containing sulfur dioxid and oxygen into contact with mineral alunite in its raw or native state. Working at temperatures between about 450° C. and about 550° C., with a mixture of sulfur dioxid and air, containing between 6.0% and 10.0% of sulfur dioxid by volume and therefore comparable to ordinary burner gas, I have attained, with raw alunite as the catalytic agent, around 70% conversion of the sulfur dioxid to sulfur trioxid. This particular percentage of conversion is merely given by way of example, since, under favorable conditions, such as exists in commercial practice, somewhat higher conversion yields can be attained.

A very important feature of the use of mineral alunite as a catalyst is the fact that the mineral is enhanced in value by such use. Raw or native alunite, while it contains valuable amounts of the sulfates of potassium and aluminum, is insoluble in water, and therefore these constituents are unavailable without a strenuous preliminary treatment. When, however, the alunite is used as a catalyst, in the contact process for producing sulfur trioxid, it is affected in such a way that the available constituents thereof become soluble in water. Accordingly, when the alunite is removed from the catalytic chamber, crushed and extracted with hot water, the solution yields, on evaporation, a practically pure potash alum which is the hydrated double sulfate of potassium and aluminum ($K_2Al_2(SO_4)_4 \cdot 24H_2O$). This salt in itself, is a valuable article of commerce and from it there can be prepared various potassium and aluminum salts.

The utilization of mineral alunite as the catalyst, in conjunction with the very advantageous change in its water-soluble properties as a result thereof, is one of the distinct novelties of the present invention. In the case of all other catalysts, the quantities used must be economized as much as possible, either because of the initial cost, as in the case of platinum, or because of the fact that the catalyst must be discarded after use, as with iron oxid. On the other hand, in employing alunite as the catalyst in accordance with the present invention, it is desirable and of advantage to use as large quantities of catalyst as possible and to change the catalyst as often as is compatible with efficient yields of sulfur trioxid and water soluble constituents, in order to produce as large a tonnage as possible of water soluble potash salts. Thus, by the contact process of the present invention, not only is there obtained a considerable conversion of sulfur dioxid to sulfur trioxid, but at the same time the potassium, aluminum and sulfur trioxid contents of the mineral alunite are rendered available.

The process of the present invention, while it primarily involves the production of sulfur trioxid or sulfuric acid by the contact method, at the same time involves the treatment of mineral alunite to render the available constituents thereof soluble in water. From the foregoing description, it will be seen that these two aims, namely, the production of sulfur trioxid and the treatment of alunite, are accomplished at one and the same time by the same methods of procedure. Thus, as far as the procedure itself is concerned, the process of the present invention is the same whether it be considered as a process for producing sulfur trioxid by the contact method or as a process for treating mineral alunite. This dual aspect of the method of the present invention is of particular advantage and is one of its important attributes, since it enables the simultaneous production of two valuable products.

What I claim is:—

1. The process of making sulfur trioxid by the contact method and simultaneously producing a water soluble double sulfate of potassium and aluminum which comprises bringing a gaseous mixture containing sulfur dioxid and oxygen into contact with mineral alunite at a temperature appropriate to the catalytic oxidation; substantially as described.

2. The process of making sulfuric acid by the contact method and simultaneously producing a water soluble double sulfate of potassium and aluminum which comprises bringing a gaseous mixture containing a sulfur dioxid and oxygen into contact with mineral alunite at a temperature appropriate to the catalytic oxidation, thus forming sulfur trioxid by the catalytic action of the alunite, and subsequently dissolving in water the double sulfate of potassium and aluminum of the alunite rendered soluble by its action as a catalyzer; substantially as described.

3. The process of making sulfur trioxid by the contact method which comprises bringing a mixture of sulfur dioxid and oxygen into contact with alunite at a temperature appropriate to the catalytic oxidation; substantially as described.

4. The process of making sulfur trioxid by the contact method, which comprises bringing a gaseous mixture containing sulfur dioxid and oxygen at a temperature from about 450° C. to about 550° C. into contact with alunite; substantially as described.

5. The process of making sulfur trioxid by the contact method which comprises bringing a gaseous mixture containing sulfur dioxid and oxygen into contact with a native mineral consisting essentially of a hydrated basic double sulfate of potassium and aluminum at a temperature appropriate to the catalytic oxidation; substantially as described.

6. In a process of making sulfur trioxid by the contact method, a catalytic agent comprising alunite; substantially as described.

7. The process of producing a water soluble double sulfate of potassium and aluminum from alunite which comprises subjecting the alunite to the action of a gaseous mixture of sulfur dioxid and oxygen at a temperature from about 450° C. to about 550° C.; substantially as described.

8. The process of rendering the naturally insoluble double sulfate of potassium and aluminum of mineral alunite soluble in water, which comprises subjecting the alunite as a catalytic agent in the contact process for making sulfuric acid to the action of a mixture of sulfur dioxid and oxygen at a temperature appropriate to the catalytic oxidation of the sulfur dioxid; substantially as described.

9. The process of treating alunite which comprises subjecting the alunite as a catalytic agent to the action of sulfur dioxid and oxygen at a temperature appropriate to the catalytic oxidation of the sulfur dioxid; substantially as described.

In testimony whereof I affix my signature.

HERBERT HENRY MEYERS.